March 19, 1929.  W. H. WHEELER ET AL  1,705,793
ANCHORAGE DEVICE
Filed Feb. 17, 1927
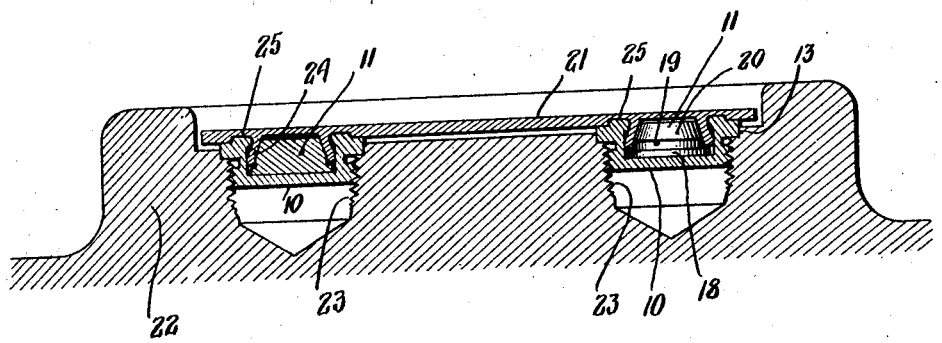
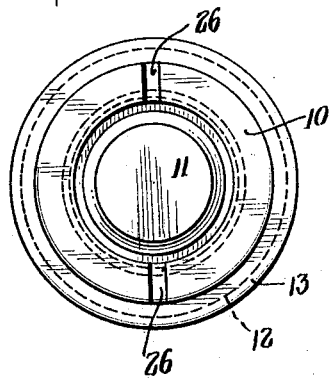 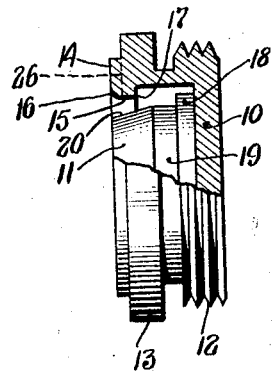
INVENTORS
William H. Wheeler
Judson C. Logan
BY
ATTORNEY Patented Mar. 19, 1929.

1,705,793

UNITED STATES PATENT OFFICE.

WILLIAM H. WHEELER, OF NEW YORK, N. Y., AND JUDSON C. LOGAN, OF JERSEY CITY, NEW JERSEY.

ANCHORAGE DEVICE.

Application filed February 17, 1927. Serial No. 168,908.

This invention relates to an improved means for anchoring a member to a suitable base in such a manner that it cannot be removed without mutilating or disfiguring the member or the base.

An object of our invention is to provide an anchorage device that is particularly adapted for securing plates, bearing numbers or other identifying indicia, to automobiles or automobile parts, in such manner as to prevent removing the plate without so mutilating it or damaging it as to render it unsuitable for use again, thereby preventing the shifting of plates from one automobile to another, as is now commonly done by thieves or their accomplices, to frustrate or render difficult the detection and identification of stolen cars.

Another object of our invention is to provide an anchorage device of very simple and inexpensive construction and which can be applied with a minimum of labor.

Another object is to provide an anchorage device comprising two members one freely movable within the other, but inseparable therefrom.

With these and other objects in view our invention consists in certain novel features of construction and combinations and arrangements of parts as will be more fully hereinafter described and defined in the claims.

In the accompanying drawings,

Figure 1 is a view in longitudinal section, showing a plate attached to a base by means of our anchorage devices;

Fig. 2 is a plan view of our anchorage device; and

Fig. 3 is a side view of our anchorage device partly broken away.

Our anchorage device consists of two members, namely, a thimble 10 and an expander plug 11. The thimble 10 is a cup-shaped member, the lower part of which is externally threaded as indicated at 12. An external flange 13 is provided near the upper end of the thimble. The rim 14 of the thimble extends above the flange 13 and projects inwardly to form a lip 15. The outer margin of the lip 15 is preferably tapered or rounded as indicated at 16, but the inner face of the lip, at its juncture with the cylindrical wall of the lip forms a sharp corner 17, the purpose of which will be explained presently.

Within the thimble 10 is placed the expander plug 11. The latter at its inner end is formed with an annular flange 18, of such diameter as to require the exercise of considerable pressure to force the plug past the lip 15 into the thimble. Hence, once the plug has been introduced into the thimble, it will not drop out and cannot be removed by ordinary means. The plug is formed with a cylindrical body portion 19, surmounted by a frusto-conical portion 20 that extends approximately to the plane of the face 16 of the rim 14, when the plug is introduced into the thimble.

Fig. 1 illustrates the manner in which our anchorage device is used for securing a plate 21 to a base 22. The latter is formed with two threaded holes 23 into which a pair of thimbles 10 are screwed. The holes 23 are preferably countersunk to provide seats for the flanges 13. The plate 21 is formed on its under surface with a pair of annular flanges 24 which are adapted to enter the thimbles 10 in the annular spaces between the lips 15 and the expander plugs 11. The rounded corners 16 assist in guiding the flanges into the thimbles. The under surface of the plate 21 is formed with a recess 25 around each flange to receive the rim 14 of the thimble. This recess serves the double purpose of providing a zone of weakness in the plate at the point of attachment and of permitting the thimble to project above the bottom plane of the plate, the advantage of which will be explained presently. The thimbles are of a size to fit snugly into the threaded holes 23 so that there will be no danger of their working loose. A slot 26 cut through the rim of each thimble provides a hold for a screw driver with which the thimble is screwed into the hole 23.

When the thimbles are in place, the plate 21 is attached to the base 22 by inserting the flanges 24 into the annular spaces between the plugs 11 and the thimbles 10, and then forcing the plate against the thimbles until the rims 14 bear against the top of the recesses 25, and the bottom surface of the plate 21 bears against the top of flange 13. In forcing the plate into this position the flanges are flared outwardly, following the contour of the plugs 11, and thereby locking the plate to the thimbles, as indicated in Fig. 3. It will be understood, of course, that one of the plugs 11, in Fig. 1 is shown in section and the other plug is shown in full. The flanges 24 are of a thickness to fit very tightly between the lips 15 and the portion 20 of the plug and also between the portion 19 and the inner wall of the thimble. The sharp corners 17 bite into the flanges 24 and prevent the latter from being withdrawn from the thimble.

The shape of the plug 11 and the fact that it is not fixed to the thimble 10, play an important part in our invention. Because of its freedom of motion within the thimble the plug can adjust itself to the flange 24, should the latter be not accurately centered with respect to the thimble. As the flange is forced down over the plug, it is first flared by the frusto-conical portion 20 and then pressed into engagement with the cylindrical portion 19, seizing the latter in a firm grip. If the plug were integral with or immovably secured in the thimble, it might be possible to withdraw the flange, but because the plug is free, and because of the tight grip of the flange on the portion 19, the plug becomes firmly attached to the flange and will rise with the flange when the latter is drawn upward, causing the corner 17 of the lip to bite into the flange and hold it fast. This hold is so firm that the plate 21 will tear along the area weakened by the recess 25, before the lip 15 will shear through the flange.

Once the plate 21 has been attached in this manner, it cannot be removed, because the thimbles 10 are made of very hard and tough metal hardened to such a degree as to make it impossible to cut the metal with saws, drills or other tools. Any effort to cut through the thimbles would therefore be frustrated. The rim of the thimble extends so far up into the plate that it would be impossible for a thief to saw through the edge of the plate clear of the rim, without breaking through the upper face of the plate, thereby mutilating the plate and betraying the fact that it had been tampered with. Any effort to pull the plate out of engagement with the thimbles would result in tearing it along the part weakened by the recesses 25. It would be impossible to draw the temper of the thimbles 10 without cutting through the base from the rear or under side, to expose the thimbles, and applying a torch to them; but the surface of the plate would be discolored by the application of heat sufficiently high to draw the temper of the thimbles. Any effort to turn the thimbles and unscrew them from the base into which they are screwed very tightly would result in tearing out a portion of the plate.

Having thus described our invention, and with the understanding that variations, modifications and alterations in structural details may be made without departing from the scope of our invention, we claim:

1. As an article of manufacture, an anchorage device comprising a thimble having a constricted mouth and formed with means for attachment to a base, and an expander plug within the thimble and having a flange of such size as to prevent the flange from being passed through the constricted mouth except by the exercise of considerable pressure.

2. As an article of manufacture, an anchorage device comprising a thimble of highly hardened metal formed with means for attachment to a base and having an inwardly projecting lip, and a plug within the thimble, having a frusto-conical upper portion and a case flange of such size as to prevent the flange from passing the lip without the exercise of considerable force.

3. As an article of manufacture, an anchorage device comprising a thimble formed with an outwardly projecting flange below the rim of the thimble and an inwardly projecting lip, the body of the thimble being exteriorly threaded below the flange, and a plug having a frusto-conical upper portion, a cylindrical median portion and a flanged lower portion, the latter being of a size to permit the plug to be forced with considerable pressure past the lip into the thimble.

WILLIAM H. WHEELER.
JUDSON C. LOGAN.